United States Patent
Chu

[19]

[11] Patent Number: 5,983,565
[45] Date of Patent: *Nov. 16, 1999

[54] PLANT POT WITH ROOT PRUNING EFFECT

[76] Inventor: Chienyoung Chu, No. 94-3, Kung-Li St., Taichung, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/754,634

[22] Filed: Nov. 21, 1996

[51] Int. Cl.$^6$ .................................................. A01G 23/02
[52] U.S. Cl. ................................................ 47/73; 47/65.6
[58] Field of Search ............................ 47/73, 65.5, 65.6, 47/76, 78; 206/423

[56] References Cited

U.S. PATENT DOCUMENTS

| | | | |
|---|---|---|---|
| 758,678 | 5/1904 | Müller | 47/65.6 |
| 1,710,878 | 4/1929 | Kelso | 47/65.5 |
| 3,785,088 | 1/1974 | Guarriello | 47/73 |
| 3,896,587 | 7/1975 | Insalaco | 47/65.5 |
| 5,010,687 | 4/1991 | Hougard | 47/65.5 |

FOREIGN PATENT DOCUMENTS

| | | | |
|---|---|---|---|
| 1561341 | 2/1969 | France | 47/66 |
| 203261 | 5/1959 | Germany | 47/65.5 |
| 4000950 | 7/1990 | Germany | 47/65.6 |

*Primary Examiner*—Michael J. Carone
*Assistant Examiner*—Joanne C. Downs

[57] ABSTRACT

A plant pot is capable of preventing roots from winding and lengthening excessively therein. The pot includes a container which has an open top, a base, and a surrounding wall. The surrounding wall has a bottom end connected to the base. The base has a central portion, a plurality of spaced apart connecting portions which extend radially from the central portion to the bottom end, and a plurality of holes which are confined by the connecting portions and the surrounding wall. The holes are elongated along the direction of the surrounding wall and are closely adjacent to the surrounding wall. Parts of the base close to the surrounding wall are mostly opened and are substantially free of corner spaces which would assist root winding and excessive lengthening.

8 Claims, 7 Drawing Sheets

PLANT POT WITH ROOT PRUNING EFFECT

BACKGROUND OF THE INVENTION

1. Field of the Invention

This invention relates to a plant pot, more particularly to a plant pot having a base, a surrounding wall, and a plurality of holes formed in the base and close to the surrounding wall.

2. Description of the Related Art

Plant growth relies on roots for absorbing nutrients, water, and oxygen. In a plant cultivating pot, roots tend to extend to the spaces between the wall of the pot and the soil where they can get more oxygen. Since the roots are geotropic, they tend to extend toward the bottom of the plant pot after extending along the space adjacent to the pot wall. FIGS. 1 and 2 show two conventional plant pots 10 and 10' which include respectively a base 12 and a surrounding wall 11. The base 12 of FIG. 1 has a circular central hole 121 therein, while the base 12 of FIG. 2 has a plurality of circular holes 122, whereby excess water can flow out of the plant pots 10 and 10' through the holes 121, 122. When the root ends 201 of the plant 200 in the pot 10 or 10' reach the base 12, they wind along a corner space formed between the base 12 and the wall 11, thereby resulting in longer roots without increasing the number of root branches. Because the plant 200 must absorb nutrients via the root ends 201, the winding roots which have fewer root ends 201 can not effectively absorb the nutrients for the growth of the plant 200. Moreover, when the plant 200 is uprooted for transplanting to soil or another pot, the longer root ends 201 are liable to break. Since the plant 200 has few and remote roots, breakage of the roots may significantly affect plant growth and may even cause the plant to wither. On the other hand, when the roots are long, a deeper hole is needed in soil or in a new pot for transplanting, thus resulting in added inconvenience.

SUMMARY OF THE INVENTION

Therefore, the objective of the present invention is to provide a plant pot which can prevent plant roots from winding and lengthening excessively therein and which can promote the growth of root branches to profit plant growth.

The above objective and advantages can be achieved through the provision of a plant pot which comprises a container with an open top, a base, and a surrounding wall having a bottom end connected to the base. The base has a central portion, a plurality of spaced apart connecting portions which extend radially from the central portion to the bottom end of the surrounding wall, and a plurality of holes confined by the connecting portions and the surrounding wall. The holes are elongated along the direction of the surrounding wall and closely adjacent to the surrounding wall so that parts of the base close to the surrounding wall are mostly opened and are substantially free of corner spaces which would assist root winding and excessive lengthening. The water draining holes arranged according to the invention are advantageous for the prevention of root winding and excessive lengthening in the plant pot and for the increase in the number of root branches. This is because, when roots reach the bottom end of the surrounding wall after extending downward along the surrounding wall, their extension may be terminated due to the existence of the holes which can cause the root ends to extend out of the mass of the wet soil of the plant pot as soon as the root ends reach the bottom end of the surrounding wall and expose the same to the surrounding environment where no sufficient water or moisture can be obtained. The termination of the root ends can promote the growth of new branching roots which can supply nutrients from the soil to the plant more effectively than excessively long roots.

The arrangement of the holes according to the present invention differs from the conventional plant pot shown in FIG. 2 in terms of structure and effect. The holes shown in FIG. 2 cannot provide the advantages offered by the invention despite of a plurality of water draining holes formed along the periphery of its base. The reasons therefor are that the holes thereof are not elongated and are spaced from the surrounding wall thereof so that a corner space is formed along the bottom end of the surrounding wall where root ends can still obtain sufficient moisture and oxygen for extension and winding along the corner of the pot.

BRIEF DESCRIPTION OF THIS DRAWINGS

Other features and advantages of the present invention will become apparent in the following detailed description of preferred embodiments of the invention, with reference to the accompanying drawings, in which.

DETAILED DESCRIPTION OF THE PREFERRED EMBODIMENTS

Before the present invention is described in greater detail, it should be noted that like elements are denoted by the same reference numbers throughout the disclosure.

Figure 1:
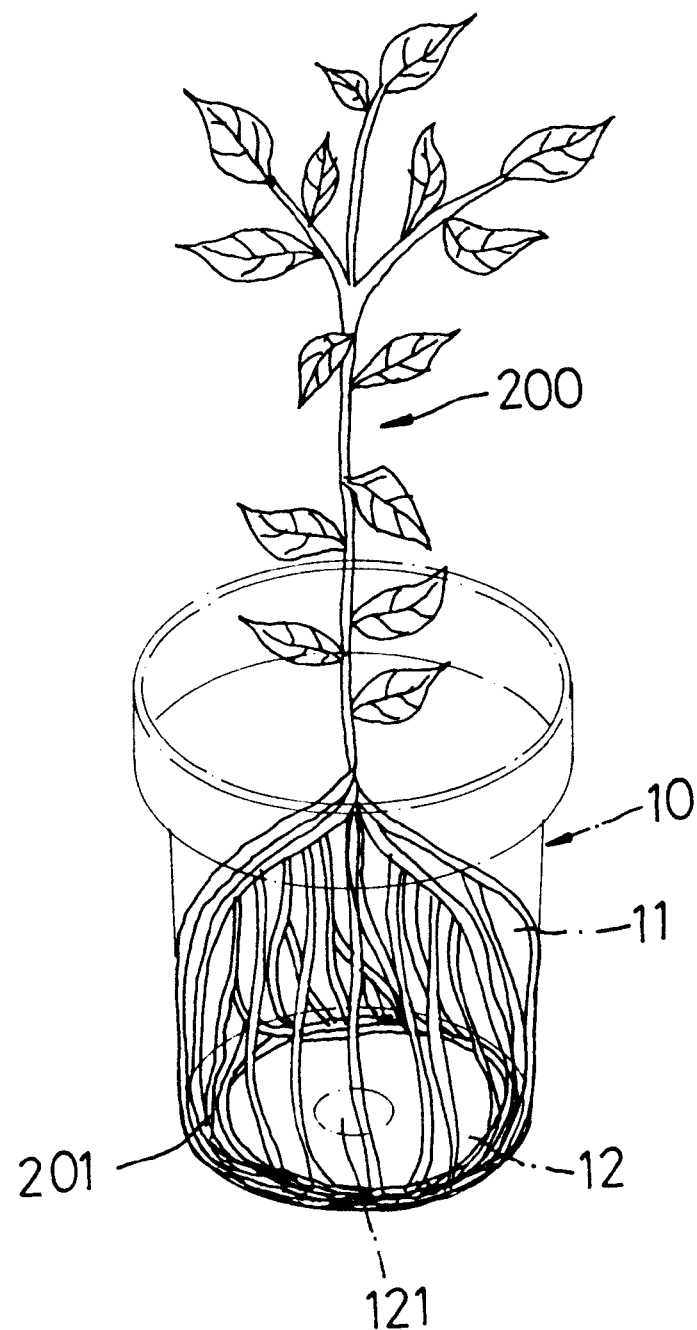
FIG. 1 is a perspective view of a conventional plant pot.
Figure 2:
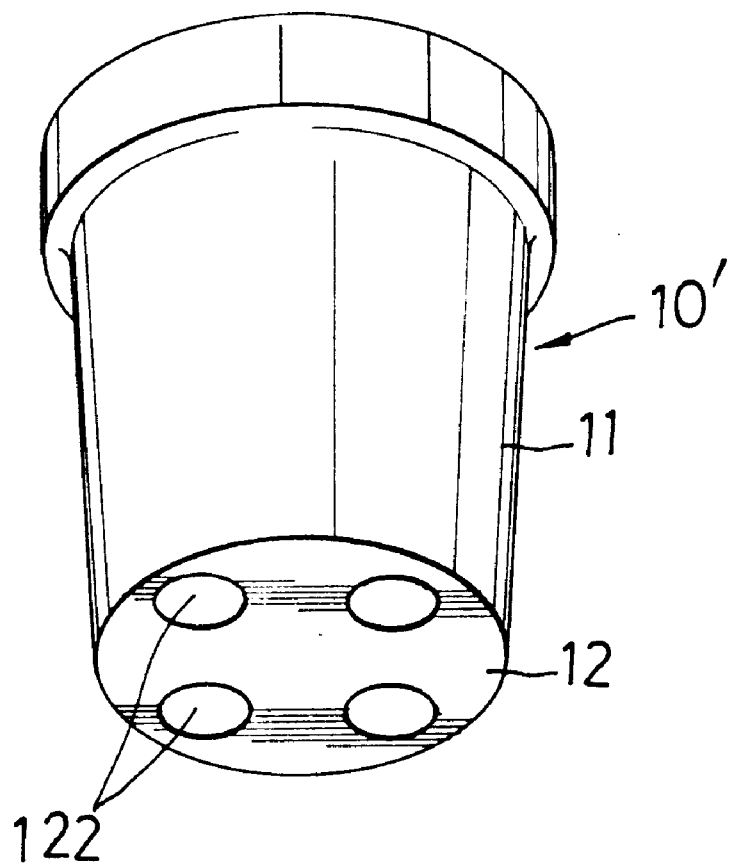
FIG. 2 is a bottom perspective view of another conventional plant pot.
Figure 3:
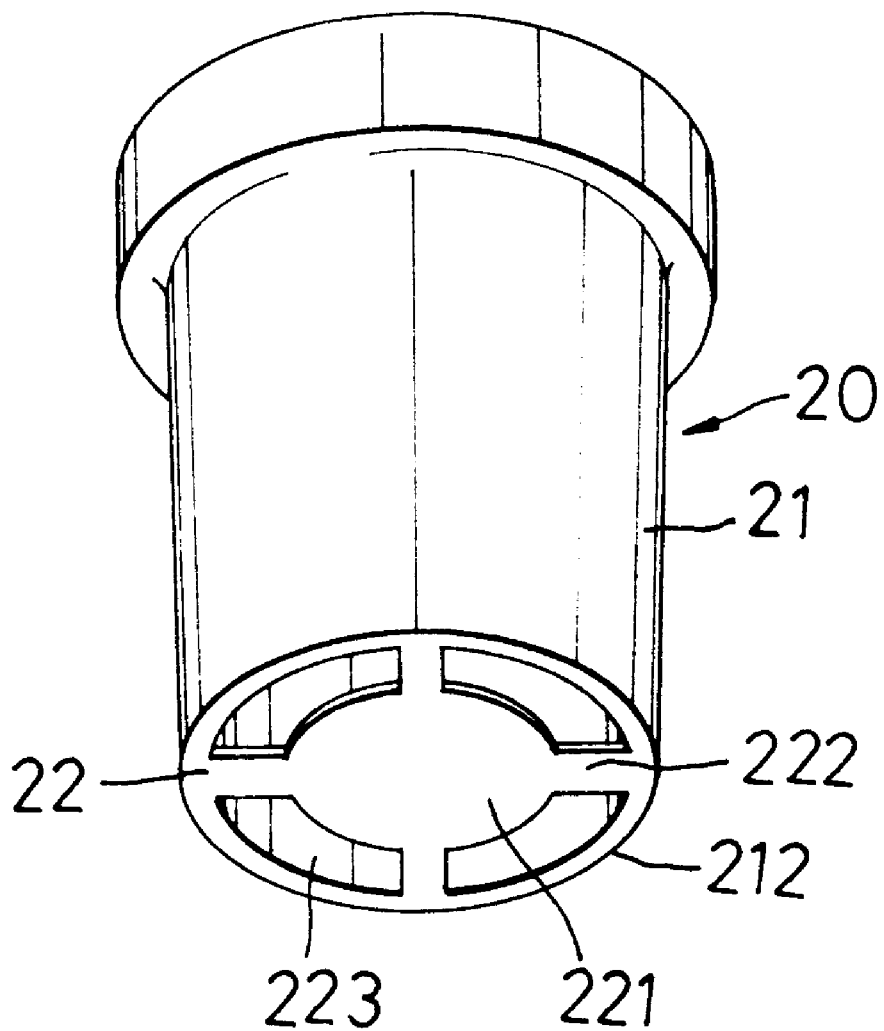
FIG. 3 is a bottom perspective view of a first preferred embodiment of the plant pot according to the present invention.

Referring to FIG. 3, a first preferred embodiment of the plant pot according to the present invention is shown to include a container 20 with a base 22 and a surrounding wall 21. The base 22 having a periphery 22B which includes upper and lower major walls 22C, 22D, opposite to each other in the axial direction. The surrounding wall 21 extending uprightly from the base's periphery 22B and including upper and lower annular end portion 213, 212 respectively distal and proximate to the periphery 22B.

The base 22 has central portion 221 and a plurality of spaced apart connecting portions 222 which extend radially and equidistantly from the central portion 221 to the bottom end 212 of the surrounding wall 21 so that the base 22 is connected to the surrounding wall 21 via the connecting portions 222. A plurality of arcuate holes 223 are respectively formed between adjacent connecting portions 222.

Figure 4:
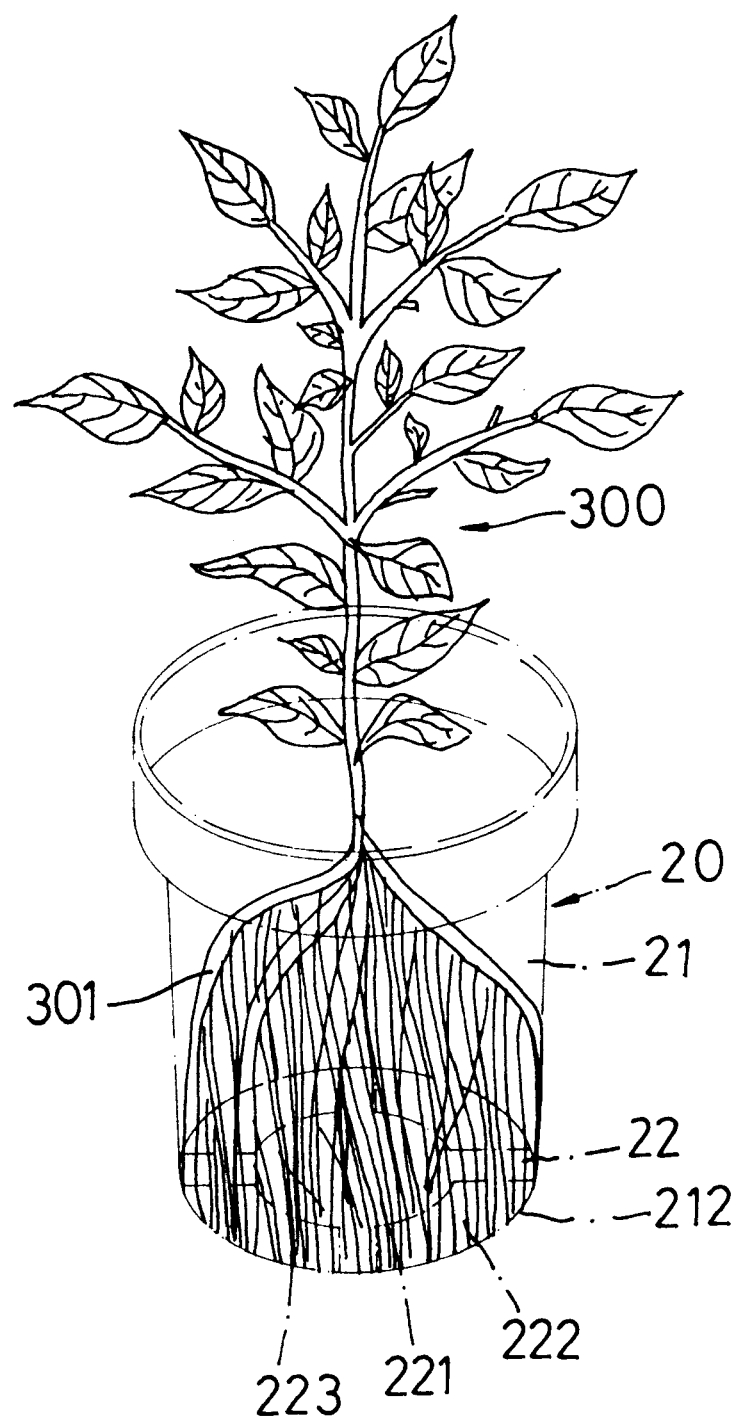
FIG. 4 is a schematic view illustrating the growth of roots in the plant pot of the present invention.

Referring to FIG. 4, there is wet soil in the container 20. As such, soil particles are cemented together by the adhesion property thereof so that they do not drop out from the container 20 through the holes 223. When a plant 300 is cultivated in the plant pot, the root ends 301 of the plant 300 first extend along the surrounding wall 21 until they reach the bottom end 212 of the surrounding wall 21 due to their geotropism. Since there are arcuate holes 223 between the bottom end 212 and the base 22, the root ends 301 extend out into the holes 223 and stop to growing further. Thus, new roots grow in the container 20 as substitute for the old root ends.

Figure 5:
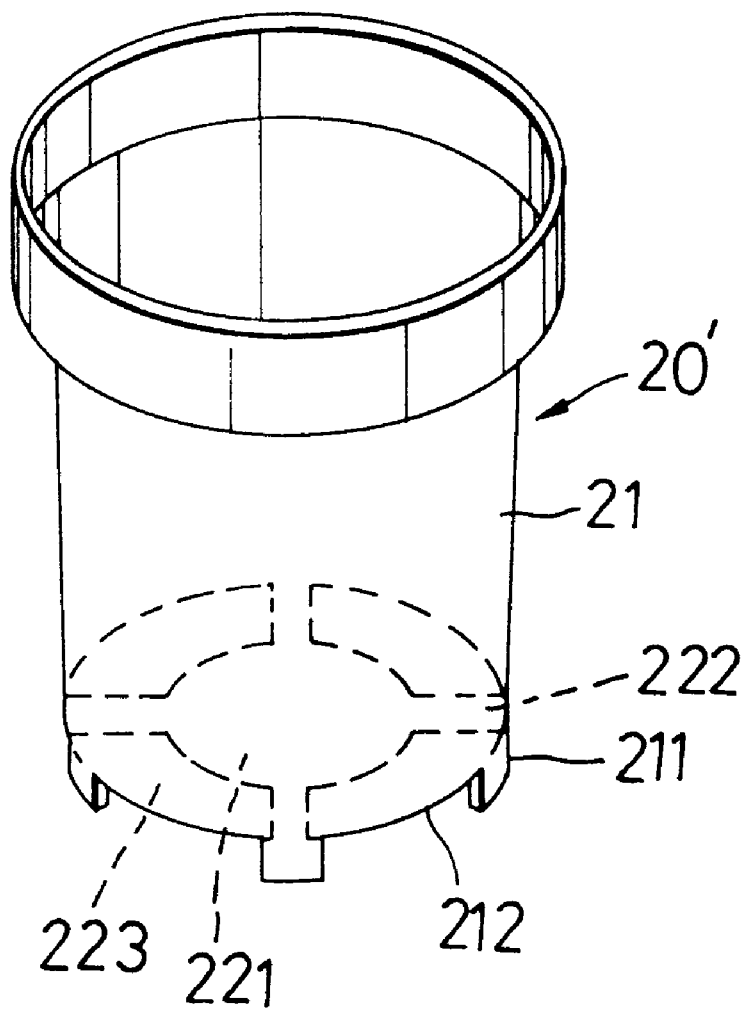
FIG. 5 is a perspective view of a second embodiment according to the present invention.

FIG. 5 shows the second preferred embodiment of the present invention, wherein, in addition to the component parts of the first preferred embodiment, the container 20' of this embodiment includes a plurality of supporting legs 211 which extend downwardly from the bottom end 212 of the surrounding wall 21 so as to prop up the plant pot from the ground.

Figure 6:
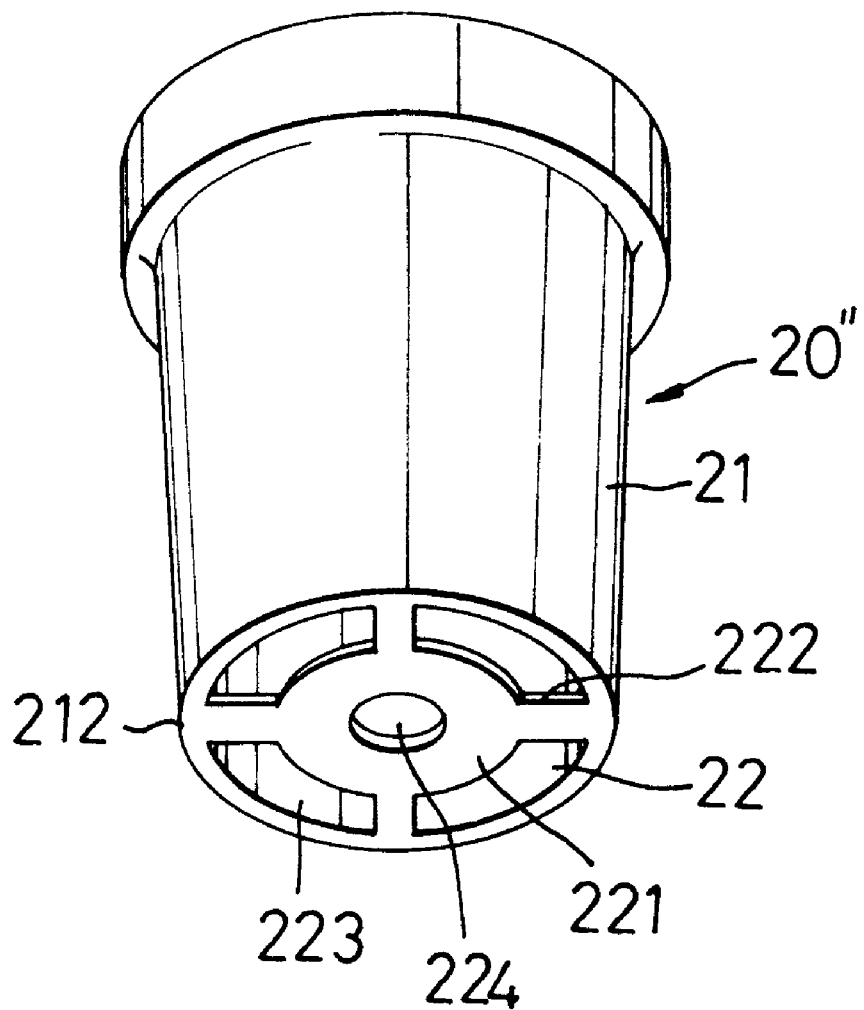
FIG. 6 is a perspective view of a third embodiment according to the present invention.

Referring to FIG. 6, the third preferred embodiment of the plant pot of the invention is shown to include a container 20" which differs from the first embodiment in that a circular hole 224 is provided in the central portion 221 of the base 22 so that more root ends can be exposed from the soil of the container 20".

Figure 7:
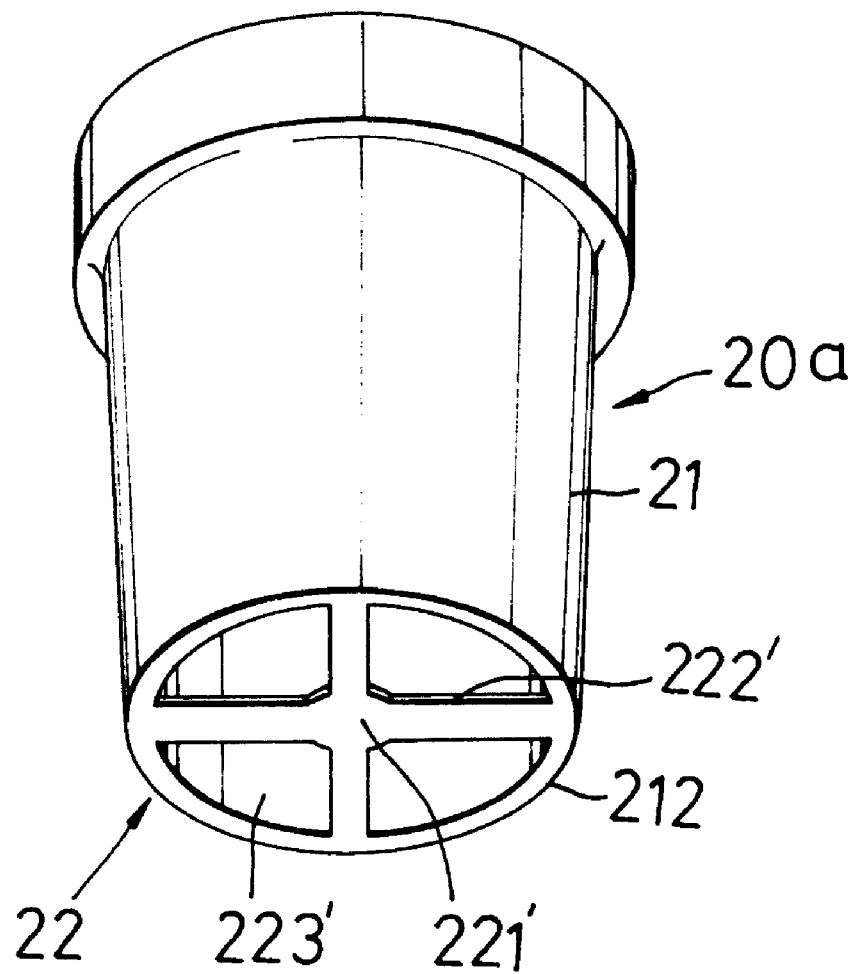
FIG. 7 is a perspective view of a fourth embodiment according to the present invention.

FIG. 7 shows the fourth preferred embodiment of the invention which includes a container (20a). The central portion 221' of the base 22 is smaller than the one in the first preferred embodiment, and the connecting portions 222' are longer than the ones in the first embodiment so that longer arcuate holes 223' are formed to enhance effectiveness in the exposure of root ends.

From the embodiments described as above, the arcuate holes 223 are elongated in the direction of the surrounding wall 21 and are close to the wall 21 so that the plant pot is substantially free of corner spaces which promote winding and excessive lengthening of roots. As a result, the length of the roots is shortened, and the number of shorter root branches is increased. The decrease in the length of the roots not only promote the growth of new branch roots but also facilitate transplanting.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A plant pot capable of preventing roots from winding and lengthening excessively therein by air pruning the roots comprising:

a base with a periphery, which includes upper and lower major walls opposite to each other in an axial direction; and a surrounding wall extending uprightly from said periphery, and including upper and lower annular end portions respectively distal and proximate to said periphery;

said base having a central portion and a plurality of angularly spaced connecting portions which extend in a radial direction from said central portion to said lower annular end portion such that two adjacent of said angularly spaced connecting portions define, together with said central portion, a hole which communicates said upper major wall with said lower major wall, each of said holes bordering at said periphery and immediately inwardly and radially from, and extending along said lower annular end portion in a form of an arcuate line so as to be adapted to admit extension of the roots outwardly of said lower major wall via said respective hole once the roots reach said periphery.

2. A plant pot as claimed in claim 1, wherein said central portion is circular.

3. A plant pot as claimed in claim 1, wherein said central portion has a circular hole therein.

4. A plant pot as claimed in claim 1, wherein a plurality of supporting legs extend downwardly from a bottom end of said surrounding wall.

5. A plant pot capable of preventing roots from winding and lengthening excessively therein by air pruning the roots comprising:

a base with a periphery which includes upper and lower major walls opposite to each other in an axial direction; and a surrounding wall extending uprightly from said periphery, and including upper and lower annular end portions respectively distal and proximate to said periphery;

said base having a central portion, a plurality of angularly spaced connecting portions which extend in a radial direction from said central portion to said lower annular end portion such that two adjacent of said angularly spaced connecting portions define, together with said central portion, a hole which communicates said upper major wall with said lower major wall; and a plurality of arcuate portions each disposed between said two adjacent angularly spaced connecting portions and immediately inwardly and radially from, and extending along said lower annular end portion so as to confine correspondingly said holes, each of said arcuate portions, being of such a short length in said radial direction so as not to deter extension of the roots outwardly of said lower major wall via said respective hole once the roots reach said arcuate portion.

6. A plant pot as claimed in claim 5, wherein said central portion is circular.

7. A plant pot as claimed in claim 5, wherein said central portion has a circular hole therein.

8. A plant pot as claimed in claim 5, wherein a plurality of supporting legs extend downwardly from a bottom end of said surrounding wall.

\* \* \* \* \*